(12) United States Patent
Suciu et al.

(10) Patent No.: US 9,394,803 B2
(45) Date of Patent: *Jul. 19, 2016

(54) BYPASS AIR-PUMP SYSTEM WITHIN THE CORE ENGINE TO PROVIDE AIR FOR AN ENVIRONMENTAL CONTROL SYSTEM IN A GAS TURBINE ENGINE

(75) Inventors: Gabriel L. Suciu, Glastonbury, CT (US); Jorn A. Glahn, Manchester, CT (US); Brian D. Merry, Andover, CT (US); Christopher M. Dye, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 1122 days.

This patent is subject to a terminal disclaimer.

(21) Appl. No.: 13/419,679

(22) Filed: Mar. 14, 2012

(65) Prior Publication Data

US 2013/0239583 A1    Sep. 19, 2013

(51) Int. Cl.

| | |
|---|---|
| *F02C 7/14* | (2006.01) |
| *F02C 9/16* | (2006.01) |
| *B64D 13/06* | (2006.01) |
| *F01D 15/08* | (2006.01) |
| *F02C 6/08* | (2006.01) |
| *F02C 7/32* | (2006.01) |
| *F02C 3/10* | (2006.01) |
| *F02C 6/04* | (2006.01) |

(52) U.S. Cl.
CPC . *F01D 15/08* (2013.01); *F02C 6/08* (2013.01); *F02C 7/32* (2013.01); *F02C 3/10* (2013.01); *F02C 6/04* (2013.01); *F02C 7/14* (2013.01); *F02C 9/16* (2013.01); *Y02T 50/671* (2013.01)

(58) Field of Classification Search
CPC ............... F02C 7/14; F02C 3/09; F02C 3/10; F02C 9/16; F02C 6/04; F02C 6/08; B64D 13/06
USPC ............... 60/792, 226.1, 262, 39.08, 266
See application file for complete search history.

(56) References Cited

U.S. PATENT DOCUMENTS

| | | | | | |
|---|---|---|---|---|---|
| 2,620,123 | A | * | 12/1952 | Parducci ................. | 417/369 |
| 2,775,208 | A | * | 12/1956 | Mueller ................. | 415/168.2 |
| 3,680,309 | A | * | 8/1972 | Wallace, Jr. .............. | 60/785 |
| 4,120,152 | A | * | 10/1978 | Jackson, III .............. | 60/221 |
| 4,254,618 | A | * | 3/1981 | Elovic ................. | F02C 7/185 |
| | | | | | 60/226.1 |
| RE31,835 | E | | 2/1985 | Rannenberg | |
| 4,627,237 | A | * | 12/1986 | Hutson .................. | 60/487 |

(Continued)

OTHER PUBLICATIONS

International Preliminary Report on Patentability issued Sep. 16, 2014.

*Primary Examiner* — William H Rodriguez
*Assistant Examiner* — Eric Linderman
(74) *Attorney, Agent, or Firm* — Bachman & LaPointe, P.C.

(57) ABSTRACT

An engine comprises a fan configured to produce propulsive thrust from a fan discharge air stream. A bypass duct is located between a cowl and an engine core, the bypass duct is fluidly coupled to the fan. The bypass duct contains the air stream created by the fan. A pump system provides the air to an environmental control system. The pump system comprises an impeller having an inlet for receiving the air from the duct and an outlet for discharging the air to the environmental control system. An intake manifold is configured to receive the air from the bypass duct and to deliver the air to the inlet. A single discharge manifold is configured to deliver the air from the outlet to the environmental control system.

14 Claims, 4 Drawing Sheets

(56) References Cited

U.S. PATENT DOCUMENTS

| | | | |
|---|---|---|---|
| 4,722,666 A | 2/1988 | Dennison et al. | |
| 5,143,329 A | 9/1992 | Coffinberry | |
| 5,357,742 A * | 10/1994 | Miller | 60/785 |
| 5,442,905 A | 8/1995 | Claeys et al. | |
| 5,447,026 A * | 9/1995 | Stanley | 60/372 |
| 5,987,877 A * | 11/1999 | Steiner | 60/39.08 |
| 6,035,627 A * | 3/2000 | Liu | 60/785 |
| 6,128,896 A | 10/2000 | Saiz | |
| 6,189,313 B1 * | 2/2001 | Cass et al. | 60/796 |
| 6,202,403 B1 * | 3/2001 | Laborie | B64D 33/08 60/39.83 |
| 6,205,770 B1 * | 3/2001 | Williams et al. | 60/204 |
| 6,250,061 B1 | 6/2001 | Orlando | |
| 6,629,428 B1 * | 10/2003 | Murry | B64D 13/06 62/401 |
| 6,908,062 B2 | 6/2005 | Munoz et al. | |
| 7,578,136 B2 | 8/2009 | Derouineau et al. | |
| 7,856,824 B2 * | 12/2010 | Anderson | B64D 13/08 60/226.1 |
| 8,397,487 B2 * | 3/2013 | Sennoun | B64D 13/06 60/266 |
| 8,602,717 B2 * | 12/2013 | Suciu et al. | 415/1 |
| 8,967,528 B2 * | 3/2015 | Mackin | F02C 6/08 244/134 R |
| 2003/0140909 A1 * | 7/2003 | Criddle et al. | 123/572 |
| 2006/0042270 A1 * | 3/2006 | Thompson et al. | 60/802 |
| 2006/0117734 A1 * | 6/2006 | Larkin et al. | 60/226.1 |
| 2007/0144138 A1 * | 6/2007 | Dooley | 60/39.08 |
| 2008/0121376 A1 * | 5/2008 | Schwarz et al. | 165/104.28 |
| 2009/0139243 A1 * | 6/2009 | Winter | 60/802 |
| 2009/0188234 A1 * | 7/2009 | Suciu et al. | 60/262 |
| 2009/0205341 A1 * | 8/2009 | Muldoon | 60/792 |
| 2009/0324396 A1 | 12/2009 | Short et al. | |
| 2010/0024434 A1 * | 2/2010 | Moore et al. | 60/788 |
| 2010/0043386 A1 * | 2/2010 | Perveiler et al. | 60/39.5 |
| 2010/0107603 A1 * | 5/2010 | Smith | 60/267 |
| 2010/0236242 A1 * | 9/2010 | Farsad et al. | 60/685 |
| 2010/0242496 A1 * | 9/2010 | Cass et al. | 60/802 |
| 2011/0131999 A1 * | 6/2011 | Gao et al. | 60/782 |
| 2011/0203293 A1 * | 8/2011 | Glahn | 60/785 |
| 2011/0289936 A1 * | 12/2011 | Suciu et al. | 60/802 |
| 2012/0159960 A1 * | 6/2012 | Brust et al. | 60/778 |
| 2012/0272658 A1 * | 11/2012 | Murphy | 60/783 |
| 2013/0047623 A1 * | 2/2013 | Suciu et al. | 60/772 |
| 2013/0047624 A1 * | 2/2013 | Suciu et al. | 60/772 |
| 2013/0086922 A1 * | 4/2013 | Suciu et al. | 60/802 |
| 2013/0097992 A1 * | 4/2013 | Suciu et al. | 60/39.83 |
| 2013/0098057 A1 * | 4/2013 | Suciu et al. | 60/779 |
| 2013/0098059 A1 * | 4/2013 | Suciu et al. | 60/783 |
| 2013/0098067 A1 * | 4/2013 | Suciu et al. | 60/802 |
| 2013/0239582 A1 * | 9/2013 | Suciu et al. | 60/785 |
| 2013/0239583 A1 * | 9/2013 | Suciu et al. | 60/785 |
| 2013/0239584 A1 * | 9/2013 | Suciu et al. | 60/792 |
| 2013/0239588 A1 * | 9/2013 | Suciu et al. | 60/806 |
| 2014/0250898 A1 * | 9/2014 | Mackin | F02C 6/08 60/772 |
| 2015/0059356 A1 * | 3/2015 | Bruno | F02C 6/08 60/785 |

\* cited by examiner

BYPASS AIR-PUMP SYSTEM WITHIN THE CORE ENGINE TO PROVIDE AIR FOR AN ENVIRONMENTAL CONTROL SYSTEM IN A GAS TURBINE ENGINE

BACKGROUND

The present disclosure relates to a pump system for use with a gas turbine engine to provide air to an aircraft environmental control system (ECS).

Gas turbine engines typically provide high-pressure air for use in the passenger cabin via an environmental control system (ECS). This air is provided by bleed ports on the engine, typically on the high pressure compressor (HPC). Bleeding compressed air from an engine may result in performance loss. As a result, the engine may have to be upsized slightly to account for work lost due to the ECS flow.

ECS air may be routed through a series of pipes and valves and then through a pre-cooler near the top of the engine/aircraft interface to cool air prior to entry into the aircraft wing, and then through the aircraft air cycle machine (ACM) for use in the cabin.

SUMMARY

In accordance with the present disclosure, there is provided an engine which broadly comprises a duct containing a flow of cool air, a pump system for providing air to an environmental control system, and the pump system comprising an impeller having an inlet for receiving cool air from the duct and an outlet for discharging air to the environmental control system.

In additional or alternative embodiments of any of the foregoing embodiments, the engine may further comprise an intake manifold for receiving the air from the duct and for delivering the air to the intake.

In additional or alternative embodiments of any of the foregoing embodiments, the engine may further comprise a discharge manifold for delivering the air from the outlet to the environmental control system.

In additional or alternative embodiments of any of the foregoing embodiments, the environmental control system may include an aircraft precooler and the discharge manifold may deliver the air to the aircraft precooler.

In additional or alternative embodiments of any of the foregoing embodiments, the engine may further comprise a valve incorporated into the discharge manifold to control the flow of the air through the discharge manifold.

In additional or alternative embodiments of any of the foregoing embodiments, the pump system may further comprise a towershaft for driving the impeller.

In additional or alternative embodiments of any of the foregoing embodiments, the engine may further comprise a spool and the towershaft being connected to the spool by a drive gear.

In additional or alternative embodiments of any of the foregoing embodiments, the spool may be a low spool connected to a fan.

In additional or alternative embodiments of any of the foregoing embodiments, the spool may be a high spool connected to a high pressure compressor.

In additional or alternative embodiments, the engine may have a fan and the duct may be a by-pass duct having an air stream created by the fan.

Further in accordance with the present disclosure, there is provided a pump system for providing air to an environmental control system, which pump system broadly comprises an air intake for receiving air from a supply of air, an impeller having an intake for receiving the air and an outlet for discharging the air, and a discharge manifold for delivering the air from the outlet to the environmental control system.

In additional or alternative embodiments of any of the foregoing embodiments, the pump system may further comprise a towershaft for driving the impeller.

In additional or alternative embodiments of any of the foregoing embodiments, the towershaft may be driven by a spool of an engine.

In additional or alternative embodiments of any of the foregoing embodiments, the spool may be a low spool.

In additional or alternative embodiments of any of the foregoing embodiments, the spool may be a high spool.

In additional or alternative embodiments of any of the foregoing embodiments, the towershaft may be connected to the spool by a drive gear.

In additional or alternative embodiments of any of the foregoing embodiments, the pump system may further comprise a valve incorporated into the discharge manifold.

Other details of the pump system for HPC ECS parasitic loss elimination are set forth in the following detailed description and the accompanying drawings wherein like reference numerals depict like elements.

DETAILED DESCRIPTION

In accordance with the present disclosure, a pump is used to raise pressure of flow from an engine fan stream for use as ECS airflow. The flow is sent via single pipe up to the standard aircraft pre-cooler and the ACM. The pump can be sized to existing ECS system requirements, replacing the HPC bleed system, with its various bosses, ports, tubes, and valving. The pump consists of a radial compressor impeller which may be driven by an engine towershaft, and thus may be located in the relatively cool forward region of the engine cowl, immediately near the fan stream intake area.

Figure 1:
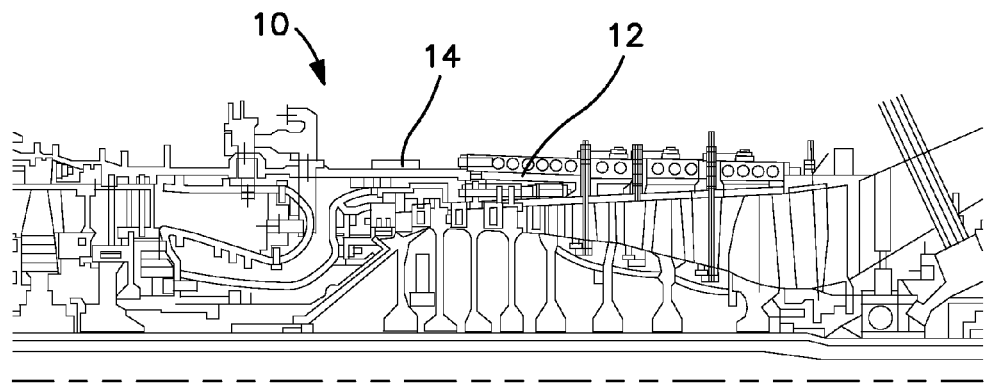
FIG. 1 is a cross-section of an engine in side view.
Figure 2:
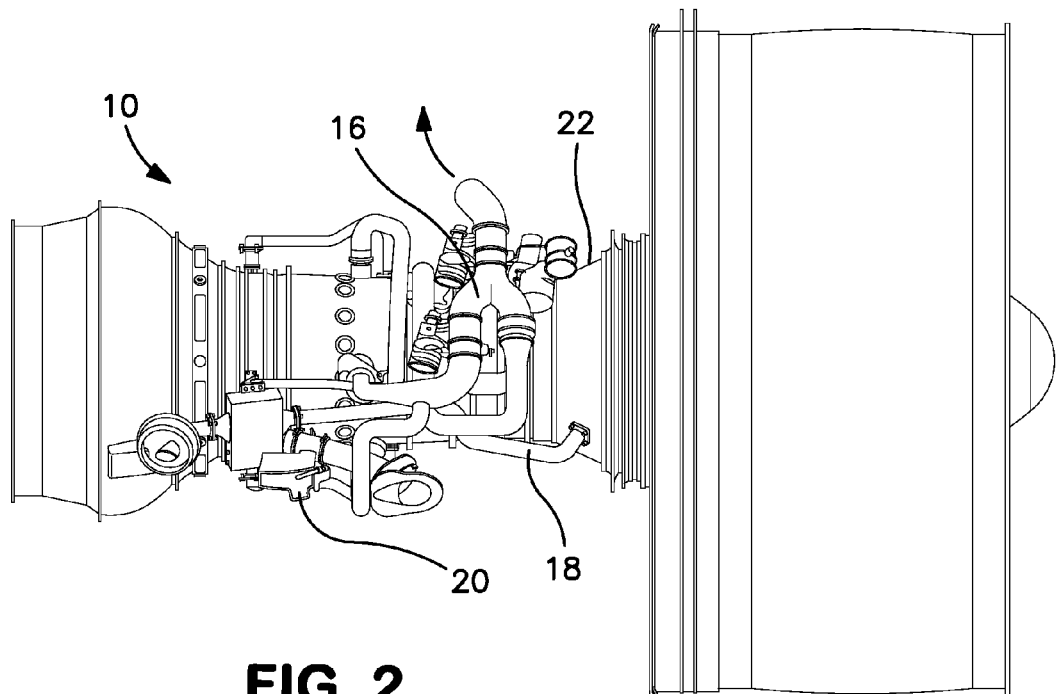
FIG. 2 is a side view of an engine having an ECS system.

Referring now to FIGS. 1 and 2, there is shown an engine with an environmental control system (ECS). As can be seen from FIG. 1, the engine 10 has a high pressure compressor (HPC) forward bleed 12 and a HPC aft bleed 14. In some engines, there may be two forward bleeds 12 and two aft bleeds 14. As can be seen from FIG. 2, the ECS system 16 has plumbing 18 and valves 20. Typically, there is a system ON-OFF valve, a high-pressure ON-OFF valve, and a low pressure anti-backflow check valve. The ECS system 16 requires considerable space around the engine core case 22.

Figure 3:
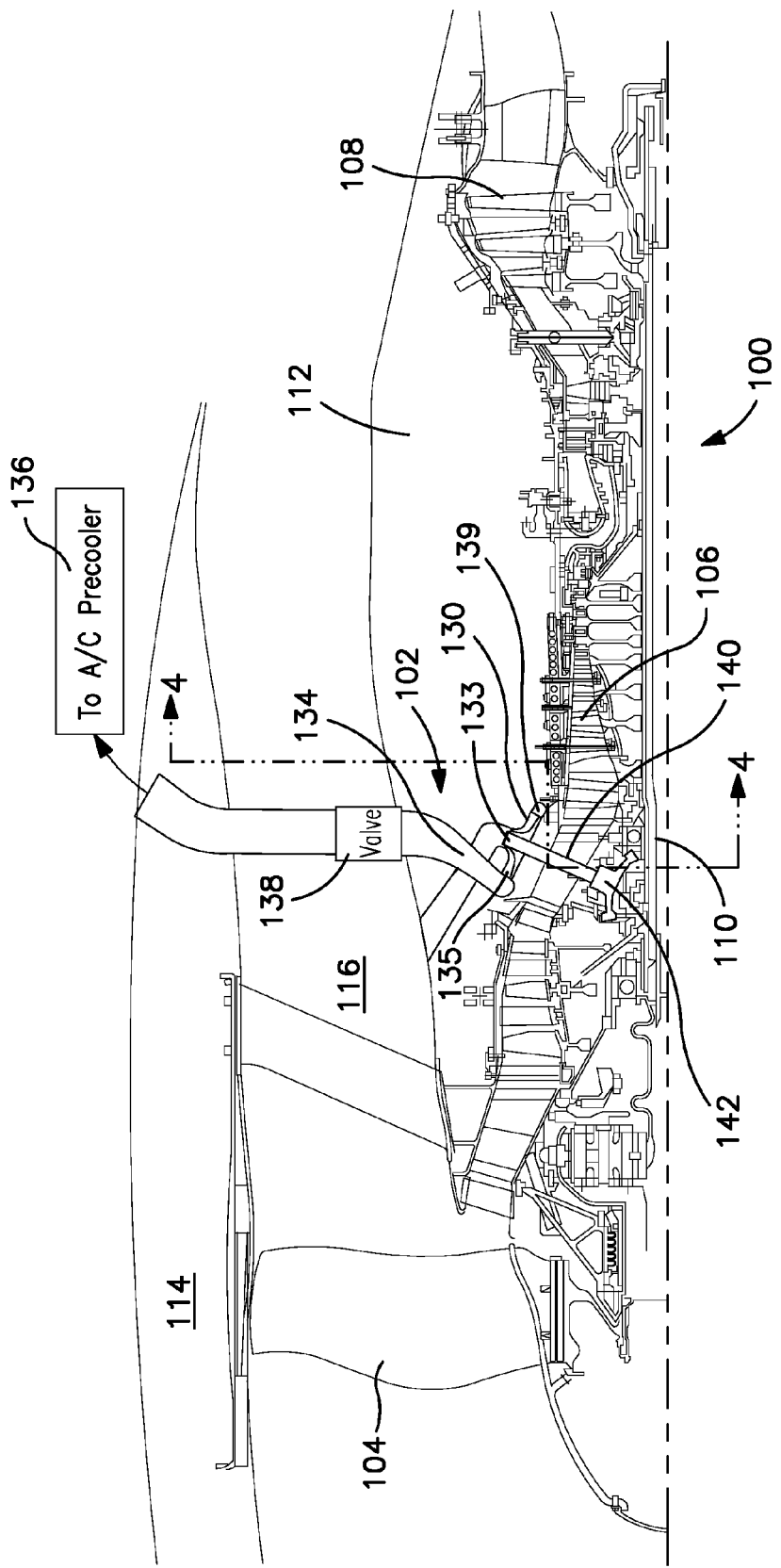
FIG. 3 is a side view of an engine having the pump system of the present disclosure.

Referring now to FIG. 3, there is shown an engine 100 having a pump system 102 for ECS parasitic loss elimination. The engine 100 includes a fan 104, a high pressure compressor 106, and a turbine section 108. The high pressure compressor 106 and the turbine section 108 are connected by at least one spool 110. As can be seen from FIG. 3, the high pressure compressor 106 and the turbine section 108 are housed in a core 112. Further, the fan 104 is surrounded by a cowl 114. A by-pass flow duct 116 is created between the cowl 114 and the core 112. Air flow created by the fan 104 passes through the by-pass flow duct 116.

Figure 6:
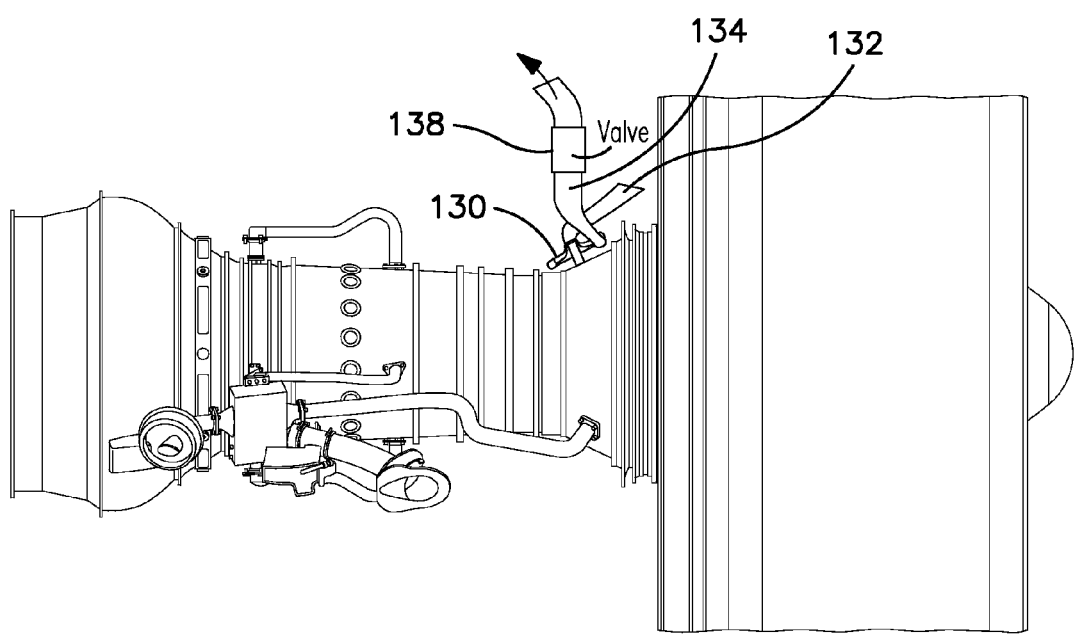
FIG. 6 illustrates a side view of an engine having the pump system of FIG. 3.

The pump system 102 includes an impeller 130 and an intake manifold 132 for delivering air from the by-pass flow duct 116 to the intake 133 of the impeller 130. As shown in FIGS. 3 and 6, intake manifold 132 is directly connected to the bypass duct and is not fluidly connected with the compressor 106. The pump system 102 further includes a pump discharge manifold 134 connected to an outlet 135 of the impeller 130. The manifold 134 delivers air to an aircraft precooler 136 which forms part of the ECS system for the aircraft. The manifold 134 may have a valve 138 to control the amount of fluid flow through the manifold 134. The valve 138 provides shutoff and failsafe capability. If desired, a 360 degree scroll collector 139 may surround the impeller 130.

The impeller 130 may be driven via a towershaft 140. The towershaft 140 may be connected to either a high-spool which connects the high pressure compressor to a high pressure turbine section or a low-spool which connects the fan 104 to a low pressure turbine section. The towershaft 140 may be connected to the spool 110 via a drive gear 142.

As can be seen from the foregoing description, cool air from the fan stream is taken into the pump system via the manifold 132. The discharge from the impeller 130 flows into a single duct (manifold 134) to the aircraft pre-cooler 136. As a consequence, ECS plumbing and the bleeds from the HPC case are eliminated for Thrust Specific Fuel Consumption (TSCF) benefit which is fuel consumption input divided by engine thrust output.

When the impeller 130 is driven by the high spool, favorable drive speed and excursions may be achieved. When the impeller 130 is driven by the low spool, high pressure compressor efficiency and Exhaust Gas Temperature (EGT) reduction at idle can be achieved. Higher EGT levels contribute to lower exhaust frame/hardware lives and thus increased cost to create an exhaust case/nozzle that is less affected by the increased temperature.

Figure 4:
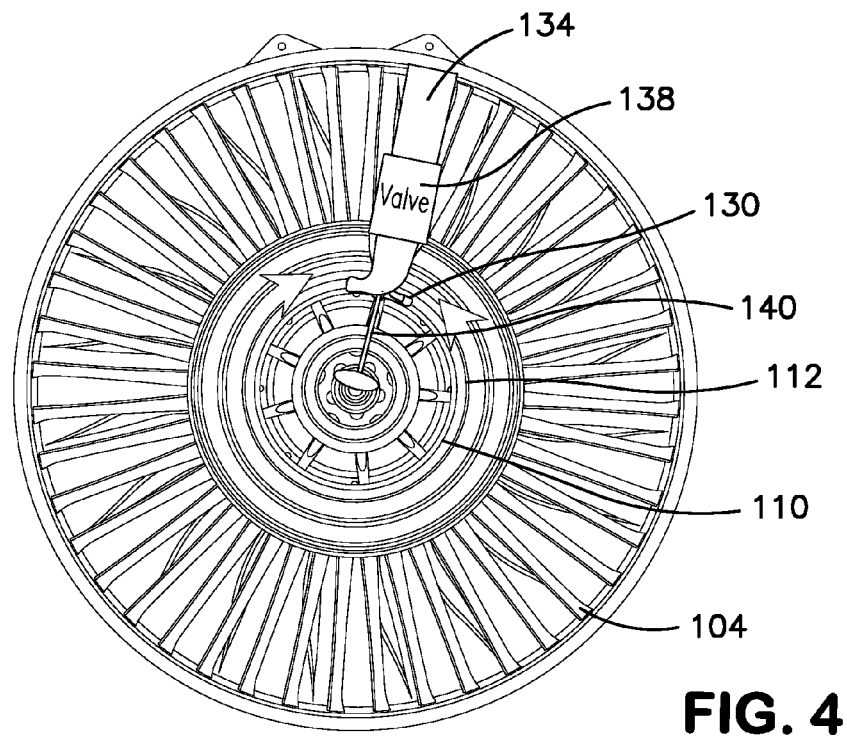
FIG. 4 is a sectional view taken along lines 4-4 of FIG. 3.

As shown in FIG. 4, the pump system 102 can be located at any convenient tangential location.

If desired, the towershaft 140 may be incorporated with an engine accessory gearbox (AGB) using the existing towershaft as a means of the drive power. If desired, the pump system may be incorporated into the AGB housing itself, the towershaft housing, or the layshaft housing to reduce packaging space.

Figure 5:
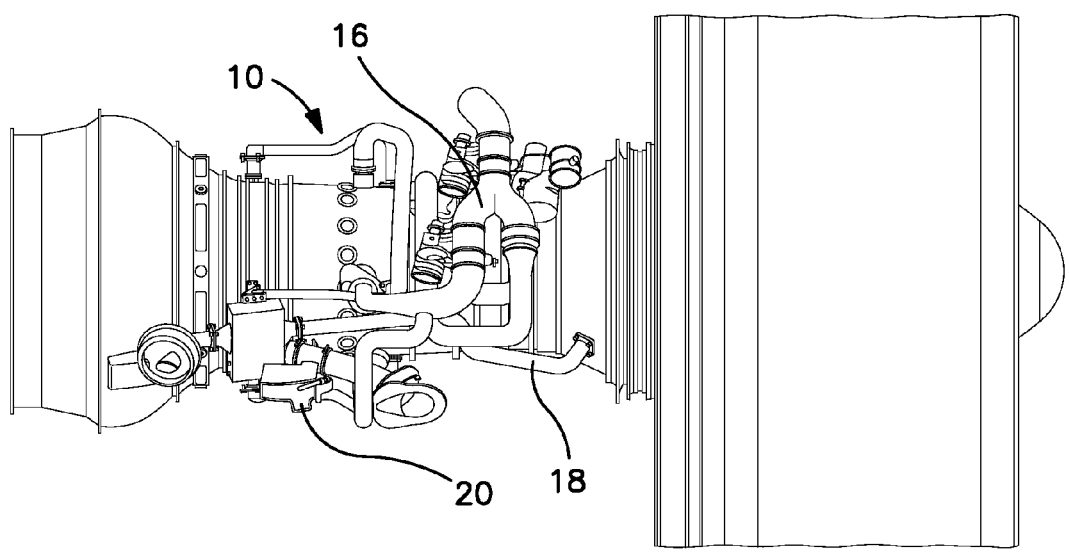
FIG. 5 illustrates a side view of an engine having a typical ECS system.

Referring now to FIG. 5, there is shown a sample of the plumbing and valves associated with a typical ECS system. Referring now to FIG. 6, there is shown the reduction of plumbing and valves that accompanies use of the pump system 102.

The pump system 102 disclosed herein provides benefits to the engine itself and engine externals system. HPC efficiency can increase measurably, approximately 2%, and with reduced distortion due to lack of ECS bleeds. EGT temperature at idle will also favorably decrease, approximately 240 degrees Fahrenheit. Overall ECS system weight will decrease due to the reduced size of necessary ECS plumbing. Accordingly, valuable externals packaging space will be created with the reduction of ECS size.

There has been provided by the instant disclosure a pump system for an HPC ECS parasitic loss elimination. While the pump system has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. An engine comprising:
   a fan configured to produce propulsive thrust from a fan discharge air stream;
   a bypass duct located between a cowl and an engine core, said bypass duct fluidly coupled to said fan without being fluidly connected to the compressor;
   said bypass duct containing said fan discharge air stream created by said fan;
   a pump system for providing said fan discharge air stream to an environmental control system;
   said pump system comprising an impeller having an inlet for receiving said fan discharge air stream from said bypass duct and an outlet for discharging said fan discharge air stream to said environmental control system;
   an intake manifold configured to receive said fan discharge air stream from said bypass duct and to deliver said fan discharge air stream to said inlet; and
   a single discharge manifold configured to deliver fan discharge air stream from said outlet to said environmental control system.

2. The engine according to claim 1, wherein said environmental control system includes an aircraft precooler and said discharge manifold delivers said fan discharge air stream to said aircraft precooler.

3. The engine according to claim 1, further comprising a valve incorporated into said discharge manifold to control the flow of said fan discharge air stream through said discharge manifold.

4. The engine according to claim 1, wherein said pump system further comprises a towershaft for driving said impeller.

5. The engine according to claim 4, further comprising a spool and said towershaft being connected to said spool by a drive gear.

6. The engine according to claim 5, wherein said spool is a low spool connected to a fan.

7. The engine according to claim 5, wherein said spool is a high spool connected to a high pressure compressor.

8. A pump system for providing fan discharge air to an environmental control system, said pump system comprising:
   a bypass duct located between a cowl and an engine core;
   an air intake for receiving a said fan discharge air from a supply of air taken from said bypass duct, and wherein said bypass duct is fluidly coupled to said fan, without being fluidly connected to the compressor;
   an impeller having an intake for receiving said fan discharge air and an outlet for discharging said discharge air; and
   a single discharge manifold for delivering said fan discharge air from said outlet to said environmental control system.

9. The pump system of claim 8, further comprising a towershaft for driving said impeller.

10. The pump system of claim 9, wherein said towershaft is driven by a spool of an engine.

11. The pump system of claim 10, wherein said spool is a low spool.

12. The pump system of claim 10, wherein said spool is a high spool.

13. The pump system of claim 10, wherein said towershaft is connected to said spool by a drive gear.

14. The pump system of claim 8, further comprising a valve incorporated into said single discharge manifold.

\* \* \* \* \*